US011794386B2

(12) United States Patent
Tonn et al.

(10) Patent No.: US 11,794,386 B2
(45) Date of Patent: Oct. 24, 2023

(54) INJECTION MOLDING APPARATUS AND METHOD FOR MANUFACTURING AN OPHTHALMIC LENS MOLD THROUGH INJECTION MOLDING

(71) Applicant: Alcon Inc., Fribourg (CH)

(72) Inventors: Thomas Tonn, Aschaffenburg (DE); Jan Bernard, Niedernberg (DE); Halina Heidrich, Kahl am Main (DE); Eduard Jetzlaff, Schollbrunn (DE); Yasin Acikgoez, Munster (DE); Maricel Teresa Repetto, Aschaffenburg (DE); Matthias Schwab, Amorbach (DE)

(73) Assignee: Alcon Inc., Fribourg (CH)

( * ) Notice: Subject to any disclaimer, the term of this patent is extended or adjusted under 35 U.S.C. 154(b) by 457 days.

(21) Appl. No.: 16/694,317

(22) Filed: Nov. 25, 2019

(65) Prior Publication Data

US 2020/0164555 A1 May 28, 2020

Related U.S. Application Data

(60) Provisional application No. 62/771,339, filed on Nov. 26, 2018.

(51) Int. Cl.
*B29C 45/04* (2006.01)
*B29C 45/40* (2006.01)
(Continued)

(52) U.S. Cl.
CPC ...... *B29C 45/0416* (2013.01); *B29C 45/4005* (2013.01); *B29K 2023/12* (2013.01); *B29L 2011/0041* (2013.01)

(58) Field of Classification Search
CPC . B29C 45/0416; B29C 45/4005; B29C 70/40; B29D 11/0048
(Continued)

(56) References Cited

U.S. PATENT DOCUMENTS 4,246,207 A * 1/1981 Spycher ................. G02B 1/041
264/2.6
5,702,735 A * 12/1997 Martin .................... B29C 45/73
425/548
(Continued)

FOREIGN PATENT DOCUMENTS

EP 0765734 A2 4/1997
JP 2006297811 A 11/2006
(Continued)

OTHER PUBLICATIONS

Burkard, Influence of mold wall coatings while demoulding in the injection molding process, 1999.

*Primary Examiner* — Matthew J Daniels
*Assistant Examiner* — Hana C Page
(74) *Attorney, Agent, or Firm* — Sheng-Hsin Hu (57) ABSTRACT

An injection molding apparatus for manufacturing an ophthalmic lens mold having a front surface comprising a lens forming portion and a rear surface, comprises a first molding tool and a second molding tool. The first and second molding tools are movable towards and away from each other between a closed position and an open position. In the closed position the first mold forming portion of the first molding tool and the second mold forming portion of the second molding tool define a cavity between them corresponding in shape to the shape of the ophthalmic lens mold. The surface of the second mold forming portion, at least in a central zone
(Continued)

thereof, has a surface roughness $S_a$ in the range of 0.3 μm to 2 μm, and a surface roughness $S_z$ in the range of 10 μm to 50 μm.

13 Claims, 2 Drawing Sheets

(51) Int. Cl.
  *B29K 23/00* (2006.01)
  *B29L 11/00* (2006.01)
(58) Field of Classification Search
  USPC ............................................. 264/537
  See application file for complete search history.

(56) References Cited

U.S. PATENT DOCUMENTS

| | | | |
|---|---|---|---|
| 5,968,422 A | 10/1999 | Kennedy | |
| 9,108,298 B2* | 8/2015 | Mase | .................. B24C 1/08 |
| 2003/0164565 A1* | 9/2003 | O'Brien | .................. B29C 45/37 |
| | | | 264/2.5 |
| 2006/0145369 A1 | 7/2006 | Awton | |
| 2012/0038072 A1 | 2/2012 | Huang | |
| 2012/0043044 A1 | 2/2012 | Mase | |

FOREIGN PATENT DOCUMENTS

| | | |
|---|---|---|
| WO | WO9900241 A1 | 1/1999 |
| WO | WO2017175463 A1 | 10/2017 |

* cited by examiner

INJECTION MOLDING APPARATUS AND METHOD FOR MANUFACTURING AN OPHTHALMIC LENS MOLD THROUGH INJECTION MOLDING

This application claims the benefit under 35 USC 119(e) of the U.S. Provisional Patent Application No. 62/771,339 filed Nov. 26, 2018, incorporated herein by reference in its entirety.

FIELD

The present invention relates to an injection molding apparatus and a method for manufacturing an ophthalmic lens mold through injection molding.

BACKGROUND

In the manufacture of ophthalmic lenses, in particular contact lenses, different kinds of manufacturing are well-known. In one kind of manufacturing the lens molds are reusable, so that after one contact lens has been manufactured with the aid of such reusable lens mold, the respective reusable lens mold is cleaned and is used again to manufacture the next contact lens. Such reusable lens molds are typically made of quartz glass or other types of high quality glass and are expensive. In another kind of manufacturing the lens molds are not reusable, i.e. the lens molds are used only once and are typically recycled after use (i.e. after a lens has been manufactured). These single-use lens molds must be cheap and must be capable of being simply and reliably manufactured in large numbers. Typically, such lens molds are manufactured through injection-molding. In injection-molding, usually two molding tools are used which can be moved towards each other to a closed position, and away from each other to an open position. Typically, one molding tool is fixedly arranged while the other molding tool is movable towards and away from the fixedly arranged molding tool, i.e. to the closed or open position, respectively. Each of the molding tools typically has a plurality of mold forming portions. In the closed position, a plurality of cavities is formed between these mold forming portions of the molding tools. These cavities correspond in shape to the lens molds to be manufactured. To simultaneously manufacture a plurality of lens molds, a moldable plastic material, for example molten polypropylene, is injected into the cavities under high pressure. After injection of the molten plastic material is completed, the plastic material contained in the cavities is allowed to cure to form the lens molds and the molding tools are moved away from each other to the open position, so that the lens molds can be removed from the respective molding tool and can subsequently be further cooled down at a different location, thus allowing the molding tools to be used again to manufacture the next plurality of lens molds in the manner described above.

Typically, such single-use plastic lens molds are comparatively thin parts (wall thickness of the lens molds is smaller than 1 millimeter [1 mm]). Also, short cycle times are desirable to close the molding tools, inject the molten plastic material into the cavities to manufacture the lens molds, open the molding tools and remove the manufactured lens molds from the respective molding tool, in order to make manufacturing of the lens molds as efficient as possible. However, as the lens molds are products for the manufacture of an optical article (e.g. a contact lens), they must fulfil high demands as regards the quality of the lens mold.

Problems in injection-molding of thin plastic products—i.e. the plastic lens molds having a small thickness of the walls—typically exist during opening of the molding tools (moving away of a movable molding tool from the fixedly arranged molding tool to which the lens molds must adhere), and during the subsequent removal of the thin plastic lens molds from the fixedly arranged molding tool.

One problem that may occur during the lifting off of the lens mold from the fixedly arranged molding tool is that—due to adhesion and/or sticking—in particular the central portion of the lens mold tends to strongly adhere to the fixedly arranged molding tool. Since the lens mold is typically removed from the molding tool by lifting an outer edge portion of the lens mold off of the molding tool (i.e. a portion of the lens mold outside the lens forming portion of the respective lens mold), due to the adhesion of the lens mold to the molding tool in the central portion elastic deformation may occur between the outer edge portion of the lens mold to which the removal forces are applied and the central portion of the lens mold. In case the adhesion forces occurring in the central portion are too high, inelastic deformation of the lens mold may occur and may lead to a permanent deviation of the geometry of the lens mold from the specified mold geometry so that the lens mold cannot be used for the manufacture of contact lenses. In some instances, also so-called "stress-whitening" (small tears or cracks in the lens mold) may occur at those portions of the lens mold which are stressed the most, again resulting in that the lens mold cannot be used for the manufacture of contact lenses.

Generally, different measures are conceivable to reduce the number of such occurrences (deviation from the desired lens geometry, stress-whitening). For example, it is conceivable to increase the temperature of the molding tool and/or to increase the after-pressure acting on the moldable plastic material already injected into the molding tool. However, such measures typically have an adverse influence on the accuracy/precision of the mold geometry of the manufactured lens mold. Another measure that is conceivable is to apply a coating to the mold forming surface of the molding tool. However, the material the mold forming surfaces of the molding tools are typically made of (aluminum) is not well suitable for processes applying a coating to the molding tool into which a plastic material (e.g. polypropylene) is injected at high temperature It is therefore an object to provide an injection molding apparatus and method for manufacturing an ophthalmic lens mold from an injection-moldable plastic material which is simple, reliable, efficient and allows for the manufacture of thin ophthalmic lens molds (thickness smaller than 1 mm) with high accuracy/precision of the mold geometry while avoiding the above-identified disadvantages that may occur during removal of the ophthalmic lens mold from the molding tool.

SUMMARY

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the term "about" is included and is explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

In accordance with the invention, this object is achieved by an injection molding apparatus as it is specified by the features of the independent claim directed to an injection molding apparatus. Advantageous aspects of the injection molding apparatus are the subject of the dependent claims directed to such injection molding apparatus. Further in accordance with the invention, this objection is achieved by a method of manufacturing a plastic ophthalmic lens mold through injection-molding as it is specified by the features of the independent claim directed to such method. Advantageous aspects of the method are the subject of the dependent claims directed to such method.

As regards the injection molding apparatus for manufacturing an ophthalmic lens mold, in particular a contact lens mold, from an injection-moldable plastic material, the ophthalmic lens mold having a front surface comprising a lens forming portion and a rear surface, the apparatus according to the invention comprises:
 a first molding tool comprising at least one first mold forming portion for forming the front surface of the ophthalmic lens mold, and
 a second molding tool comprising at least one second mold forming portion for forming the rear surface of the ophthalmic lens mold.

The first and second molding tools are movable towards and away from each other between a closed position, in which the ophthalmic lens mold can be manufactured by injection molding, and an open position, in which the manufactured ophthalmic lens mold can be removed. In the closed position the at least one first mold forming portion of the first molding tool and the at least one second mold forming portion of the second molding tool define a cavity between them corresponding in shape to the shape of the ophthalmic lens mold to be manufactured. The surface of the second mold forming portion, at least in a central zone that corresponds to a portion on the rear surface of the ophthalmic lens mold opposite to the lens forming portion on the front surface, has a surface roughness $S_a$ in the range of 0.3 µm to 2 µm, and a surface roughness $S_z$ in the range of 10 µm to 50 µm.

In accordance with one aspect of the injection molding apparatus according to the invention, the surface roughness $S_a$ is about 1 µm.

In accordance with another aspect of the injection molding apparatus according to the invention, the surface roughness $S_z$ is about 25 µm.

In accordance with still another aspect of the injection molding apparatus according to the invention, at least the lens mold forming portions of the first and second molding tools are made from aluminum.

Yet in accordance with another aspect of the injection molding apparatus according to the invention, the surface roughness of the second mold forming portion has been created using one or more techniques selected from the group consisting of laser roughening, sand blasting, grinding, and lapping.

According to another aspect of the injection molding apparatus according to the invention, the first mold forming portion of the first molding tool and the second mold forming portion of the second molding tool correspond to each other in shape so that in the closed position the cavity formed between them has a uniform thickness.

In accordance with yet another aspect of the injection molding apparatus according to the invention, the second molding tool comprises an ejector which is arranged outside of the central zone of the second mold forming portion.

As regards the method of manufacturing a plastic ophthalmic lens mold, in particular a contact lens mold, through injection-molding, the ophthalmic lens mold having a front surface comprising a lens forming portion and a rear surface, the method according to the invention comprises the steps of
 providing a first molding tool comprising at least one first lens mold forming portion for forming the front surface of the ophthalmic lens mold; and
 providing a second molding tool comprising at least one second lens mold forming portion for forming the rear surface of the ophthalmic lens mold.

The first and second molding tools are movable towards and away from each other between a closed position and an open position.

The method further comprises the step of moving the first and second molding tools to the closed position.

In the closed position the at least one first lens mold forming portion of the first molding tool and the at least one second lens mold forming portion of the second molding tool define a cavity between them. The cavity corresponds in shape to the shape of the ophthalmic lens mold to be manufactured.

The method further comprises the steps of
 injecting an injection-moldable plastic material into the cavity to manufacture the ophthalmic lens mold through injection-molding;
 moving the first and second molding tools to the open position; and removing the ophthalmic lens mold from the second molding tool.

The step of providing a second molding tool comprises providing a second molding tool having a surface of the second lens mold forming portion which, at least in a central zone corresponding to a portion on the rear surface of the ophthalmic lens mold opposite to the lens forming portion on the front surface, has a surface roughness $S_a$ in the range of 0.3 µm to 2 µm, and a surface roughness $S_z$ in the range of 10 µm to 50 µm.

According to one aspect of the method according to the invention, the surface roughness $S_a$ is about 1 µm.

According to another aspect of the method according to the invention, the surface roughness $S_z$ is about 25 µm.

In accordance with yet a further aspect of the method according to the invention, at least the lens mold forming portions of the first and second molding tools are made from aluminum.

Yet in accordance with another aspect of the method according to the invention, the moldable plastic material is a polyolefin, in particular polypropylene (but may also be another polyolefin like polyethylene).

In accordance with a further aspect of the method according to the invention, removing the ophthalmic lens mold from the second molding tool is performed by pressing an ejector against a portion of the rear surface of the ophthalmic lens mold outside of the portion that corresponds to the lens forming portion on the front surface.

The injection molding apparatus and method according to the invention are advantageous in that the surface roughness $S_a$ and $S_z$ of the second mold forming portion of the second molding tool is in the range of 0.3 µm to 2 µm for $S_a$, and is in the range of 10 µm to 50 µm for $S_z$, respectively, at least in a central zone thereof which corresponds to a portion located on the rear surface of the ophthalmic lens mold opposite to the lens forming portion on the front surface. Frankly spoken, in that area where the front surface of the ophthalmic lens mold has the lens forming portion the rear surface of the front surface of the mold forming portion of the molding tool has a well-defined surface roughness that is within the specified ranges. As a result of having a surface roughness in the specified ranges it is possible to manufacture thin ophthalmic lens molds, in particular contact lens molds, through injection molding within very short cycle times, while it is possible at the same time to safely remove the lens mold from the molding tool and to avoid the problems described above (e.g. deformation and/or stress-whitening of the lens mold). For example, the cycle time can be as low as five seconds in total or even less for closing the first and second molding tools, injecting the injection-moldable plastic material into the cavities formed between the mold forming portions of the closed molding tools to form the ophthalmic lens molds in the cavities through injection molding, opening the molding tools and removing the ophthalmic lens molds from the second molding tool. Typically, without being limited thereto, one molding tool is fixedly arranged while the other molding tool is movable towards and away from the fixedly arranged molding tool. Again without being limited thereto, the molding tools are preferably configured such that the lens mold remains on the fixedly arranged molding tool.

Only by way of example, a number of 10-20 ophthalmic lens molds can be simultaneously produced with the molding tools of the injection molding apparatus according to the invention, for example using molten polypropylene which is injected at a temperature in the range of 200°-250° Celsius and at a pressure in the range of 600-800 bars which pressure may reduce by 30% to 50% on the way through so-called runners into the cavities formed between the first and second mold forming portions of the first and second molding tools. The first and second molding tools including their mold forming portions may have a temperature which is in the range of 20°-30° Celsius, and the after-pressure applied to the injected moldable plastic material, for example molten polypropylene, may be about 500-600 bars. Removal of the ophthalmic lens molds from the mold forming portion of the second molding tool is possible without the ophthalmic lens molds getting damaged through inelastic deformation of the ophthalmic lens molds or through stress-whitening, although at the time of removal the ophthalmic lens molds may still have a temperature that may be as high as 70°-90° Celsius, so that the ophthalmic lens molds—once removed—need to further cool down before they can be used in the manufacture of ophthalmic lenses. However, manufacturing of ophthalmic lens molds using such injection molding apparatus is highly effective as large numbers of ophthalmic lens molds can be produced in a very short time which is highly desirable as the plastic ophthalmic lens molds can be used only once and are then typically recycled.

The surface roughness $S_a$ is a well-known parameter. $S_a$ denotes the arithmetic mean height about a mean surface. Mathematically, $S_a$ this can be described by the formula:

$$S_a = \frac{1}{NM} \sum_{i=1}^{N} \sum_{j=1}^{M} |Z(x_i, y_j)|$$

wherein
$Z(x_i, y_j)$ denotes the respective height above or below the mean surface at the coordinates $x_i$, $y_j$ of the mean surface,
M denotes the total number of y-coordinates of the mean surface at which heights are measured at the respective x-coordinate
denotes an integer running from 1 to M
N denotes the total number of x-coordinates of the mean surface at which heights are measured,
i denotes an integer running from 1 to N.

This means that for determining $S_a$ a total number of N times M heights are measured. For example, first at the coordinate $x_1$ the heights $Z(x_1,y_1)$, $Z(x_1,y_2)$ ... $Z(x_1,y_M)$ are measured, thereafter at the coordinate $x_2$ the height $Z(x_2,y_1)$, $Z(x_2,y_2)$ ... $Z(x_2,y_M)$ are measured, and so on, until at the coordinate $x_N$ the heights $Z(x_N,y_1)$, $Z(x_N,y_2)$ ... $Z(x_N,y_M)$ are measured. The absolute values of these N times M individual heights are added, and then the so obtained sum is divided by the total number of N times M.

Determination of $S_a$ can be carried out using the confocal microscope 'Confovis DUO Vario' available from the company confovis GmbH, Jena, Germany. The objective used in the afore-mentioned confocal microscope is an objective '50×ELWD 0.6 NA' available from the company Nikon, Japan (wherein ELWD stands for Extra Long Working Distance, NA stands for Numerical Aperture). Imaging is performed at a working distance of 11 mm (millimeters), and with a stitching of 2×2 (meaning that four squares in total each having a size of 250 µm×250 µm are selected for imaging). The parameter 'Qualitätswert' in the software of the confocal microscope 'Confovis DUO Vario' is selected to be 100 (indicating that a quality filter of 100% is used which means that a measurement point filter in accordance with DIN EN ISO 25178 is applied). Evaluation is then performed using the software 'Mountains Map® Imaging Topography', available from the company Digital Surf, Besancon, France. This software performs a best sphere fit, applies a Gaussian filter according to DIN EN ISO 16610, and performs an evaluation of the surface height parameters in accordance with DIN EN ISO 25178, to determine $S_a$.

Also, the surface roughness $S_z$ is a well-known parameter. The surface roughness $S_z$ denotes the average distance between the maximum peak height and the lowest valley depth relative to a mean surface, averaged over a total number s of local maximum peak heights $Z_p$ and the same total number s of local maximum valley depths $Z_v$ of a sample area. The absolute values of these maximum peak heights and the maximum valley depths $Z_v$ are added, and the sum is then divided by the total number s of local maximum peak heights $Z_p$ and the same number of total maximum valley depths $Z_v$.

Mathematically, this can be described by the formula:

$$S_z = \left( \sum_{i=1}^{s} |Z_{pi}| + \sum_{j=1}^{s} |Z_{vj}| \right) / s$$

with the parameters of the formula denoting the respective parameters described in the preceding paragraph. The determination of $S_z$ can be carried out using the same devices and set-up described above for the determination of $S_a$.

Advantageously, the surface roughness $S_a$ is about 1 µm while the surface roughness $S_z$ can be chosen from the afore-mentioned range. Also advantageously, the surface roughness $S_z$ is about 25 µm while the surface roughness $S_a$ can be chosen from the afore-mentioned range. In a specific advantageous combination both the surface roughness $S_a$ is about 1 μm and the surface roughness $S_z$ is about 25 μm.

When the mold forming portions of the apparatus are made from aluminum, this is advantageous as aluminum has a good thermal conductivity, and it is possible to repeatedly and reliably manufacture the geometries of the mold forming portions with very high accuracy/precision. This is important as the molded products—the ophthalmic lens molds—must be manufactured with high accuracy/precision since they are used for the manufacture of ophthalmic lenses such as contact lenses which are optical articles and therefore require optical quality.

Advantageous techniques which may be used for generating the afore-discussed surface roughness are laser roughening, sand blasting, grinding, and lapping, although other techniques can be used as well. Using the afore-mentioned techniques it is reliably possible to create a surface having a surface roughness which is in the specified ranges.

When the first mold forming portion and the second mold forming portion of the first and second molding tools have corresponding shapes, it is possible to produce ophthalmic lens molds having a uniform wall thickness with high accuracy/precision. Such uniform wall thickness is advantageous in that homogeneous shrinkage of the moldable plastic material may occur during injection molding which is compensated for by the injection of additional moldable plastic material and the application of a high after-pressure. For example, this uniform wall thickness may be in the range of less than 1 mm and may, for example, be as low as 0.7 mm.

As has already been described, the injection molding apparatus may comprise an ejector which is arranged outside of the central zone of the second mold forming portion. This is advantageous as the ophthalmic lens mold can be removed from the second molding tool by pressing against the rear surface of the ophthalmic lens mold in a portion outside of that portion on the rear surface that is located opposite to the lens forming portion on the front surface. This means that the mechanical forces for removing the ophthalmic lens mold from the second molding tool are applied to a portion of the ophthalmic lens mold which is located away from that portion of the ophthalmic lens mold that is later used to form the ophthalmic lens.

During injection molding the moldable plastic material, e.g. polypropylene, shrinks onto the mold forming portion of the second molding tool, and in particular in that portion on the rear surface of the ophthalmic lens mold that is located opposite to the lens forming portion on the front surface the moldable plastic material tends to stick to the mold forming portion of the molding tool. Such sticking is prevented or at least greatly reduced by the specified surface roughness of the molding tool in the corresponding mold forming portion of the molding tool, so that mechanical forces applied to the ophthalmic lens mold in a portion outside of the portion of the rear surface opposite to the lens forming portion enables safe removal of the ophthalmic lens mold from the molding tool.

BRIEF DESCRIPTION OF THE DRAWINGS

Further advantageous aspects of the injection molding apparatus and method for manufacturing an ophthalmic lens mold will become apparent from the following description of an embodiment with the aid of schematic drawings in which.

DETAILED DESCRIPTION OF EMBODIMENTS

Figure 1:
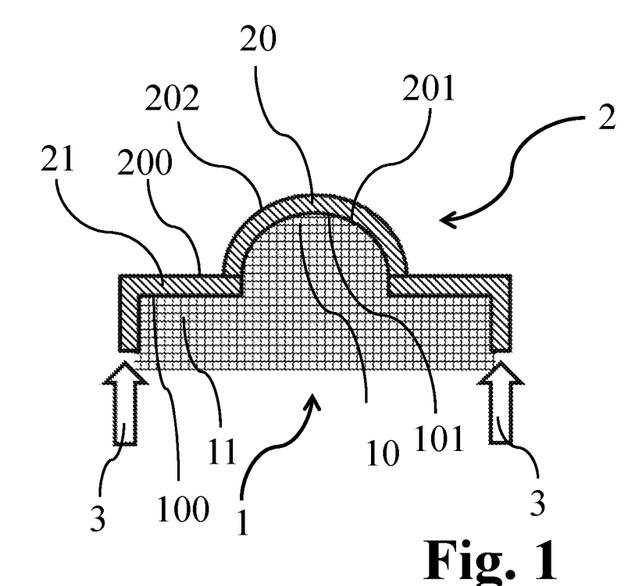
FIG. 1 shows the mold forming portion of a molding tool of a conventional injection molding apparatus and an ophthalmic lens mold arranged thereon, with removal forces being applied to the rear surface of the ophthalmic lens mold.

In FIG. 1 the mold forming portion 1 of a fixedly arranged molding tool of a conventional injection molding apparatus is shown in a schematic representation. In the embodiment shown in FIG. 1 the injection molding apparatus comprises molding tools having mold forming portions configured to manufacture male ophthalmic lens molds. However, the following description similarly applies to an injection molding apparatus that comprises molding tools having mold forming portions configured to manufacture female ophthalmic lens molds. The essential difference then is that the mold forming portions of the molding tools are configured to manufacture female ophthalmic lens molds.

Turning back to FIG. 1, mold forming portion 1 of the fixedly arranged molding tool comprises a central mold forming portion 10 and a peripheral mold forming portion 11. Central mold forming portion 10 and peripheral mold forming portion 11 together have a front surface 100 that has a central zone 101 (corresponding to the portion of the front surface 100 of the central mold forming portion 10). The injection molding apparatus further comprises a further molding tool (not shown) that comprises a further mold forming portion. This further molding tool with the further mold forming portion is movable towards and away from the fixedly arranged molding tool to a closed an open position of the molding tools, respectively.

For the manufacture of an ophthalmic lens mold, the movable molding tool is first moved to the closed position. In this closed position, a cavity is formed between the mold forming portion of the movable molding tool (not shown) and the mold forming portion 1 of the fixedly arranged molding tool. This cavity corresponds in shape to the ophthalmic lens mold to be manufactured. A moldable plastic material, for example molten polypropylene, is then injected under high pressure into the cavity through a so-called runner that is connected to the cavity. The moldable plastic material injected into the cavity is then allowed to cure to form an ophthalmic lens mold 2 that corresponds in shape to the cavity formed between the mold forming portion of the movable molding tool (not shown) and the mold forming portion 1 of the fixedly arranged molding tool. During curing, the plastic material shrinks onto the mold forming portion 1 of the fixedly arranged molding tool, and in particular in the area of the central mold forming portion 10 the plastic material may stick to the central zone 101 of the surface 100 of the mold forming portion 1 of the molding tool.

The so formed ophthalmic lens mold 2 comprises a central portion 20 and a peripheral portion 21. The central portion 20 and the peripheral portion 21 of ophthalmic lens mold 2 together have a front surface 200 that comprises a lens forming portion 202 for determining the shape of the rear surface of an ophthalmic lens to be formed using ophthalmic lens mold 2. Opposite to that lens forming portion 202 on the front surface 200 there is a corresponding portion 201 of the rear surface of the ophthalmic lens mold 2. Peripheral portion 21 of ophthalmic lens molds 2 is not involved in determining the shape of an ophthalmic lens that is formed when using ophthalmic lens mold 2.

Turning back to the manufacturing of the ophthalmic lens mold through injection molding, once injection and ophthalmic lens mold formation is completed the movable molding tool is moved away from the fixedly arranged molding tool. Ophthalmic lens mold 2 must then be removed from the fixedly arranged molding tool comprising mold forming portion 1. This is typically performed by applying removal forces 3 (indicated by the arrows in FIG. 1) to the rear surface of the ophthalmic lens mold 2 in the peripheral portion 21, i.e. outside of the portion 201 of the rear surface that corresponds to the lens forming portion 202 on the front surface 200. Application of the removal forces 3 outside of the portion 201 is performed since the (central) lens forming portion 202 of the ophthalmic lens mold must not be deformed as lens forming portion 202 is responsible for the shape of the ophthalmic lens (e.g. contact lens) to be molded using ophthalmic lens mold 2.

So far injection molding of an ophthalmic lens mold is conventional and well-known in the art.

Figure 2:
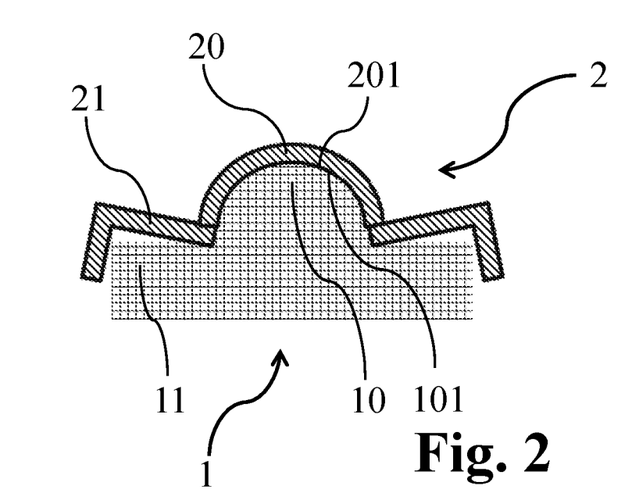
FIG. 2 shows the mold forming portion of FIG. 1 and the deformation of the ophthalmic lens mold as well as the sticking of the ophthalmic lens mold to the central zone of the surface of the mold forming portion of the molding tool.

However, when attempting to remove ophthalmic lens mold 2 from mold forming portion 1 through the application of removal forces 3 (see FIG. 2) it may occur that, due to the portion 201 of ophthalmic lens mold 2 sticking to the central zone 101 of the front surface 100, the ophthalmic lens mold 2 deforms to an extent such that after its removal it is outside the geometric specifications for the ophthalmic lens mold 2 so that it cannot be used anymore for the manufacture of an ophthalmic lens (e.g. contact lens). Also, stress-whitening (small tears or cracks in the plastic material) may occur during removal which also results in that the ophthalmic lens mold 2 cannot be used for the manufacture of an ophthalmic lens (e.g. contact lens).

Figure 3:
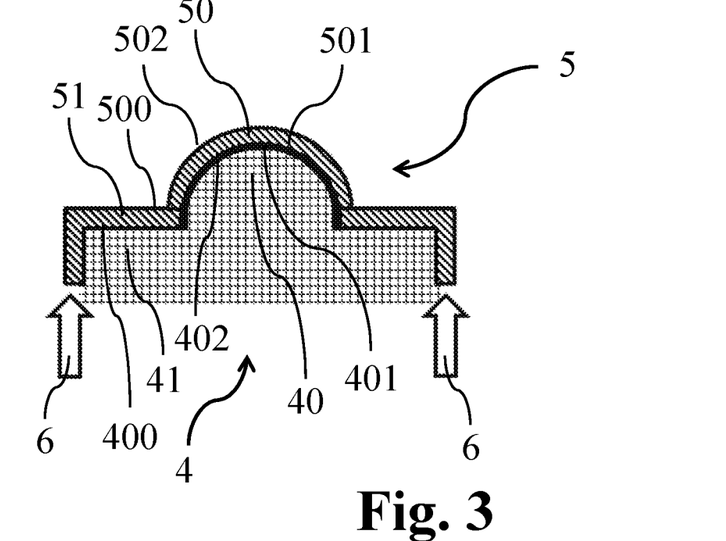
FIG. 3 shows a mold forming portion of the molding tool of an embodiment of the injection molding apparatus according to the invention, having the particular surface roughness in a central zone of the surface of the mold forming portion of the molding tool and the ophthalmic lens mold arranged thereon, with removal forces being applied to the rear surface of the ophthalmic lens mold.

In FIG. 3, the mold forming portion 4 of a fixedly arranged molding tool of an injection molding apparatus according to the invention is shown in a schematic representation. Mold forming portion 4 comprises a central mold forming portion 40 and a peripheral mold forming portion 41. Central mold forming portion 40 and peripheral mold forming portion 41 together have a front surface 400 that has a central zone 401 (corresponding to the portion of the front surface 400 of the central mold forming portion 40). The injection molding apparatus according to the invention further comprises a further molding tool (not shown) comprising a further mold forming portion. This further molding tool is movable towards and away from the fixedly arranged molding tool to a closed an open position of the molding tools, respectively.

Unlike the embodiment shown in FIG. 1, at least the central zone 401 of the front surface 400 of mold forming portion 4 of the fixedly arranged molding tool has a surface roughness $S_a$ in the range of 0.3 μm to 2 μm, and a surface roughness $S_z$ in the range of 10 μm to 50 μm. In particular, the surface roughness $S_a$ may be about 1 μm and the surface roughness $S_z$ may be about 25 μm. It is also possible that $S_a$ be about 1 μm and $S_z$ be selected from the range of 10 μm to 50 μm. Alternatively, $S_a$ may be selected from the range of 0.3 μm to 2 μm while $S_z$ is about 25 μm. This surface roughness of central zone 401 of the front surface 400 is indicated in FIG. 3 by the thickened line 402.

For the manufacture of the ophthalmic lens mold 5, the movable molding tool (not shown) is moved to the closed position. In this closed position, a cavity is formed between the mold forming portion of the movable molding tool (not shown) and the mold forming portion 4 of the fixedly arranged molding tool. This cavity corresponds in shape to the ophthalmic lens mold to be manufactured. Preferably, the cavity has a uniform thickness so that the formed ophthalmic lens mold 5 also has a uniform wall thickness which is preferred as regards a homogeneous shrinkage of the moldable plastic material during injection molding. This in turn is advantageous with respect to the manufacturing of ophthalmic lens molds with high precision and accuracy as regards the geometric specifications of the ophthalmic lens mold 5 and as regards the optical quality of the lens forming surface of the ophthalmic lens mold 5. A moldable plastic material, for example molten polypropylene, is then injected under high pressure into the cavity through a so-called runner that is connected to the cavity. While after-pressure is applied, the moldable plastic material injected into the cavity is allowed to cure to form an ophthalmic lens mold 5 corresponding in shape to the cavity formed between the mold forming portion of the movable molding tool (not shown) and the mold forming portion 4 of the fixedly arranged molding tool. During curing the plastic material shrinks onto the mold forming portion 4 of the fixedly arranged molding tool. Optionally, small projections (not shown) or other suitable means may be provided on the lateral surfaces of the mold forming portion 4 of the fixedly arranged molding tool to ensure that the ophthalmic lens mold 5 is retained on the mold forming portion 4 of the fixedly arranged molding tool in any event. Due to the well-defined surface roughness in the central zone 401 of the front surface 400 of mold forming portion 4 of the molding tool, the plastic material of ophthalmic lens mold 5 does not stick anymore or only loosely sticks to the surface 400 in the central zone 401 thereof.

The so formed ophthalmic lens mold 5 comprises a central portion 50 and a peripheral portion 51. The central portion 50 and the peripheral portion 51 of ophthalmic lens mold 5 together have a front surface 500 that comprises a lens forming portion 502 for determining the shape of the rear surface of an ophthalmic lens to be formed using ophthalmic lens mold 5. Opposite to that lens forming portion 502 on the front surface 500 there is a corresponding portion 501 of the rear surface of the ophthalmic lens mold 5. Peripheral portion 51 of the ophthalmic lens mold 5 is not involved in determining the shape of an ophthalmic lens that is formed when using ophthalmic lens mold 5.

Injection molding is performed in the manner already described above. Once injection and ophthalmic lens mold formation are completed the movable molding tool is moved away from the fixedly arranged molding tool. Ophthalmic lens mold 5 must then be removed from the fixedly arranged molding tool comprising mold forming portion 4. This is typically performed by applying removal forces 6 (indicated by the arrows in FIG. 3) to the rear surface of the ophthalmic lens mold 5 in the peripheral portion 51, i.e. outside of the portion 501 opposite to the lens forming portion 502.

Application of the removal forces 6 outside of the portion 501 can be performed with the aid of an ejector which may, for example, comprise a number of ejector pins arranged in circumferential direction, or may comprise a ring-shaped ejector, or may be any other suitable type of ejector.

Figure 4:
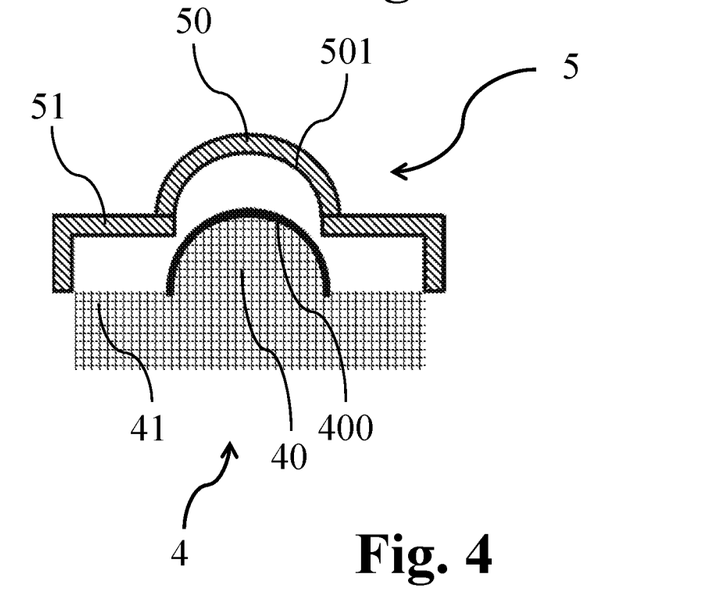
FIG. 4 shows the mold forming portion of the molding tool of the embodiment of the injection molding apparatus of FIG. 3 with the ophthalmic lens mold during removal from the molding tool without deformation and sticking of the ophthalmic lens mold to the central zone of the surface of the mold forming portion of the molding tool.

As can be seen best in FIG. 4, due to the portion 501 of the rear surface of the ophthalmic lens mold 5 no longer sticking to the central zone 401 of the front surface 400 of the mold forming portion 4 of the fixedly arranged molding tool, ophthalmic lens mold 5 can be easily removed from the mold forming portion 4 of the fixedly arranged molding tool without the occurrence of deformation or stress-whitening. This increases the yield and efficiency of the injection-molding process and in particular enables to manufacture single use plastic ophthalmic lens molds in very short overall cycle times, as has been described further above.

The invention has been described with respect to an embodiment. However, the invention is not intended to be limited to this embodiment, but rather many variations are possible without departing from the teaching underlying the instant invention. For example, the molding tool of the injection molding apparatus may be configured for the manufacturing of a female ophthalmic lens mold, as has been mentioned already. Also, instead of the parameters $S_a$ and $S_z$ it is conceivable to use other standard roughness parameters such as $R_a$ and $R_z$ instead. Therefore, many additional variations are intended to be covered by the teaching of the invention, and therefore the scope of protection is defined by the appended claims.

The invention claimed is:

1. Injection molding apparatus for manufacturing an ophthalmic lens mold (5) from an injection-moldable plastic material, the ophthalmic lens mold having a front surface (500) comprising a lens forming portion (502) and a rear surface, the injection molding apparatus comprising
    a first molding tool comprising at least one first mold forming portion for forming the front surface of the ophthalmic lens mold,
    a second molding tool comprising at least one second mold forming portion (4, 40, 41) for forming the rear surface (501) of the ophthalmic lens mold (5),
    wherein the first and second molding tools are movable towards and away from each other between a closed position, in which the ophthalmic lens mold (5) can be manufactured by injection molding, and an open position, in which the manufactured ophthalmic lens mold (5) can be removed from the second molding tool,
    and wherein in the closed position the at least one first mold forming portion of the first molding tool and the at least one second mold forming portion of the second molding tool define a cavity between them corresponding in shape to the shape of the ophthalmic lens mold (5) to be manufactured,
    wherein the surface (400) of the second mold forming portion (4, 40, 41), at least in a central zone (401) that corresponds to a portion (501) on the rear surface of the ophthalmic lens mold opposite to the lens forming portion (502) on the front surface (500), has a surface roughness $S_a$ in the range of 0.3 μm to 2 μm, and a surface roughness $S_z$ in the range of 10 μm to 50 μm.

2. Injection molding apparatus according to claim 1, wherein the surface roughness $S_a$ is about 1 μm.

3. Injection molding apparatus according to claim 1, wherein the surface roughness $S_z$ is about 25 μm.

4. Injection molding apparatus according to claim 1, wherein at least the first mold forming portion and second mold forming portion are made from aluminum.

5. Injection molding apparatus according to claim 1, wherein the surface roughness of the second mold forming portion has been created using one or more techniques selected from the group consisting of laser roughening, sand blasting, grinding, and lapping.

6. Injection molding apparatus according to claim 1, wherein the first mold forming portion of the first molding tool and the second mold forming portion of the second molding tool correspond to each other in shape so that in the closed position the cavity formed between them has a uniform thickness.

7. Injection molding apparatus according to claim 1, wherein the second molding tool comprises an ejector which is arranged outside of the central zone of the second mold forming portion.

8. Method of manufacturing a plastic ophthalmic lens mold (5), through injection-molding, the ophthalmic lens mold (5) having a front surface (500) comprising a lens forming portion (502) and a rear surface, the method comprising the steps of:
    providing a first molding tool comprising at least one first lens mold forming portion for forming the front surface of the ophthalmic lens mold;
    providing a second molding tool comprising at least one second lens mold forming portion (4, 40, 41) for forming the rear surface of the ophthalmic lens mold, wherein the first and second molding tools are movable towards and away from each other between a closed position and an open position;
    moving the first and second molding tools to the closed position, wherein in the closed position the at least one first lens mold forming portion of the first molding tool and the at least one second lens mold forming portion of the second molding tool define a cavity between them, the cavity corresponding in shape to the shape of the ophthalmic lens mold to be manufactured;
    injecting an injection-moldable plastic material into the cavity to manufacture the ophthalmic lens mold (5) through injection-molding;
    moving the first and second molding tools to the open position;
    removing the ophthalmic lens mold (5) from the second molding tool;
    wherein the step of providing a second molding tool comprises providing a second molding tool having a surface (400) of the second mold forming portion (4, 40, 41) which, at least in a central zone (401) corresponding to a portion (501) on the rear surface of the ophthalmic lens mold (5) opposite to the lens forming portion (502) on the front surface, has a surface roughness $S_a$ in the range of 0.3 μm to 2 μm, and a surface roughness $S_z$ in the range of 10 μm to 50 μm.

9. Method according to claim 8, wherein the surface roughness $S_a$ is about 1 μm.

10. Method according to claim 8, wherein the surface roughness $S_z$ is about 25 μm.

11. Method according to claim 8, wherein at least the lens mold forming portions of the first and second molding tools are made from aluminum.

12. Method according to claim 9, wherein the moldable plastic material is a polyolefin.

13. Method according to claim 9, wherein removing the ophthalmic lens mold from the second molding tool is performed by pressing an ejector against a portion of the rear surface of the ophthalmic lens mold outside of the portion opposite to the lens forming portion on the front surface.

\* \* \* \* \*